US012584521B2

(12) United States Patent
Kilchyk et al.

(10) Patent No.: US 12,584,521 B2
(45) Date of Patent: Mar. 24, 2026

(54) HYBRID AIRFOIL BEARING WITH ACTIVE DAMPING

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 72 days.

(21) Appl. No.: 18/362,669

(22) Filed: Jul. 31, 2023

(65) Prior Publication Data

US 2025/0043821 A1      Feb. 6, 2025

(51) Int. Cl.
  *F16C 32/04*       (2006.01)
  *H02K 7/09*        (2006.01)
(52) U.S. Cl.
  CPC ........... *F16C 32/0408* (2013.01); *H02K 7/09* (2013.01)
(58) Field of Classification Search
  CPC   F16C 32/0408; F16C 39/066; F16C 2326/01; F16C 2360/44; F16C 2360/46; F16C 2362/52; F16C 32/0402; F16C 32/0425; F16C 17/024; H02K 7/09
  USPC ....................................................... 310/90.5
  See application file for complete search history.

(56) References Cited

U.S. PATENT DOCUMENTS 3,614,181 A    10/1971  Meeks
4,082,376 A  *  4/1978  Wehde ..................... H02K 7/09
                                                      310/90.5

4,128,280 A    12/1978  Purtschert
4,444,444 A     4/1984  Benedetti et al.
5,345,127 A     9/1994  New
5,519,274 A     5/1996  Scharrer
5,726,560 A     3/1998  Eakman et al.
5,894,181 A     4/1999  Imlach
6,135,640 A    10/2000  Nadjafi
(Continued)

FOREIGN PATENT DOCUMENTS

CN      111102293 A      5/2020
CN      115199705 A     10/2022
(Continued)

OTHER PUBLICATIONS

Search Report issued in European Patent Application No. 24190392. 1; Date of Mailing Dec. 20, 2024 (11 pages).
(Continued)

*Primary Examiner* — Ahmed Elnakib
(74) *Attorney, Agent, or Firm* — CANTOR COLBURN LLP

(57)          ABSTRACT

A hybrid bearing assembly is provided and includes stationary components, a shaft disposed to rotate relative to the stationary components, passive magnetic bearing components integrated into the shaft and the stationary components to generate passive magnetic force to resist radial movement of the shaft relative to the stationary components and an active damping system. The active damping system includes a stationary coil, a magnetic element rotatable with the shaft to induce current in the stationary coil and a circuit electrically coupled with the stationary coil. The circuit is configured to determine from the current an attitude change of the shaft and the magnetic element and to apply damping current to the stationary coil to resist the attitude change.

16 Claims, 5 Drawing Sheets

(56) References Cited

U.S. PATENT DOCUMENTS

| | | | |
|---|---|---|---|
| 6,877,963 | B2 | 4/2005 | Beyer et al. |
| 6,965,181 | B1 | 11/2005 | Heshmat et al. |
| 7,836,601 | B2 | 11/2010 | El-Shafei |
| 8,113,799 | B2 | 2/2012 | Wu et al. |
| 8,531,071 | B2 | 9/2013 | Klusman |
| 8,772,992 | B2 | 7/2014 | Lee et al. |
| 9,234,522 | B2 | 1/2016 | Jonsson et al. |
| 10,385,915 | B2 | 8/2019 | Himmelmann |
| 10,634,154 | B2 | 4/2020 | Morgan et al. |
| 11,421,591 | B2 | 8/2022 | Jin |
| 11,905,993 | B2 | 2/2024 | Lee et al. |
| 2004/0042692 | A1 | 3/2004 | Matsunaga |
| 2006/0208589 | A1 | 9/2006 | Foshage et al. |
| 2007/0069597 | A1* | 3/2007 | Taniguchi ............. F04D 29/057 384/106 |
| 2007/0164626 | A1 | 7/2007 | Taniguchi et al. |
| 2009/0009017 | A1 | 1/2009 | Miyagawa et al. |
| 2010/0247010 | A1 | 9/2010 | Lee et al. |
| 2011/0156394 | A1 | 6/2011 | Klusman |
| 2013/0000328 | A1* | 1/2013 | Levy ....................... F25B 9/004 62/402 |
| 2014/0252899 | A1 | 9/2014 | Looser |
| 2014/0341710 | A1 | 11/2014 | Creamer |
| 2019/0003488 | A1 | 1/2019 | Stefanovic et al. |
| 2022/0099102 | A1 | 3/2022 | Okano et al. |
| 2023/0407914 | A1 | 12/2023 | Lee et al. |
| 2024/0410422 | A1 | 12/2024 | Kilchyk et al. |
| 2025/0084860 | A1 | 3/2025 | Kilchyk et al. |
| 2025/0084899 | A1 | 3/2025 | Kilchyk et al. |

FOREIGN PATENT DOCUMENTS

| | | | |
|---|---|---|---|
| DE | 2702659 | A1 | 7/1978 |
| EP | 687827 | A1 | 12/1995 |
| JP | H0921420 | A | 1/1997 |
| WO | 2016140426 | A1 | 9/2016 |

OTHER PUBLICATIONS

Bekinal et al., "A hybrid (permanent magnet and foil) bearing set for complete passive levitation of high-speed rotors" Proceedings of the Institution of Mechanical Engineers, Part C: Journal of Mechanical Engineering Science 231.20 (Oct. 2017) pp. 3679-3689.

Extended European Search Report for EP Application No. 24196535.9, dated Feb. 13, 2025, pp. 1-11.

Hirani et al., "Hybrid (hydrodynamic+ permanent magnetic) journal bearings" Proceedings of the Institution of Mechanical Engineers, Part J: Journal of Engineering Tribology 221.8 (Aug. 2007): pp. 881-891.

Huang et al., "Magneto-aerostatic bearing for miniature air turbine" Mechanics & Industry 16.1 (2015): 105. pp. 1-9.

Liu et al., "Hybrid gas-magnetic bearings: An overview" International Journal of Applied Electromagnetics and Mechanics 66.2 (Jan. 2021): pp. 313-338.

Morosi et al., "Stability analysis of flexible rotors supported by hybrid permanent magnet-gas bearings" PACAM XI-11th Pan-American Congress of Applied Mechanics, Jan. 2010. pp. 1-8.

Search Report issued in European Patent Application No. 24180736.1; Mailed Nov. 15, 2024 (11 pages).

Search Report issued in European Patent Application No. 24199720.4; Date of Mailing Feb. 4, 2025 (10 pages).

Slininger et al., "An overview on passive magnetic bearings" 2021 IEEE International Electric Machines & Drives Conference (IEMDC). IEEE, (May 2021) pp. 1-8.

Uzhegov et al., "Design Aspects of High-Speed Electrical Machines With Active Magnetic Bearings for Compressor Applications", IEEE Transactions on Industrial Electronics, vol. 64, No. 11, Nov. 2017, pp. 8427-8436.

Van Beneden et al., "Optimal sizing and comparison of permanent magnet thrust bearings" IEEE Transactions on Magnetics 53.2 (Feb. 2017) pp. 1-10.

* cited by examiner

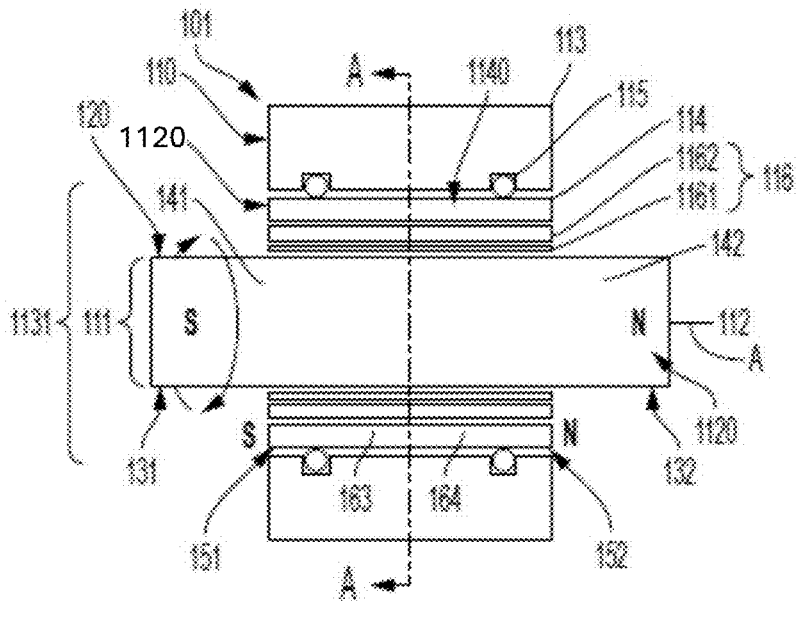
FIG. 1A
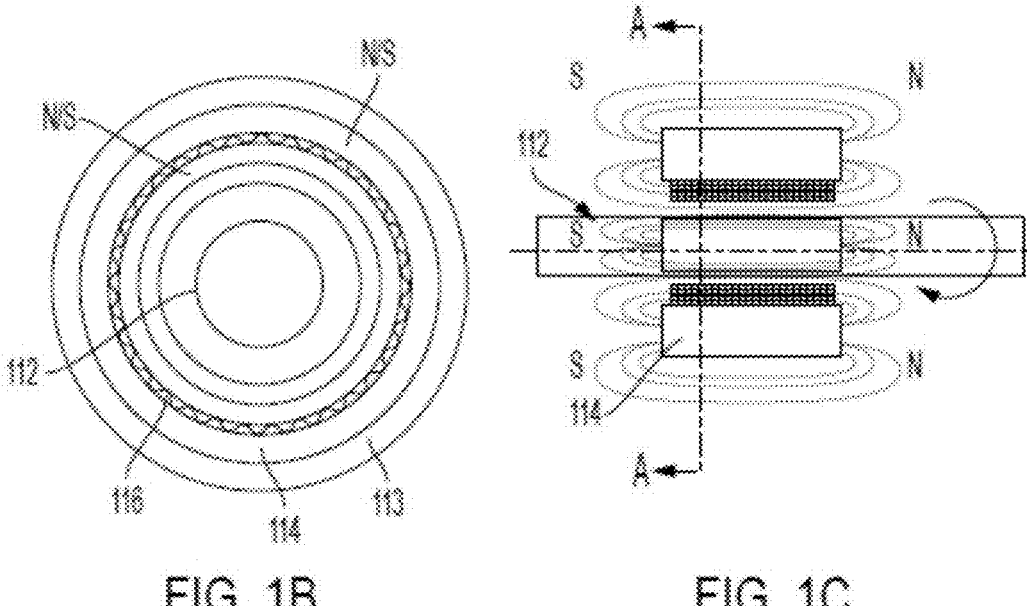
FIG. 1B                    FIG. 1C 301
310
320
3401
340 { 3401 / 3402 }
3401
330
3402
FIG. 3
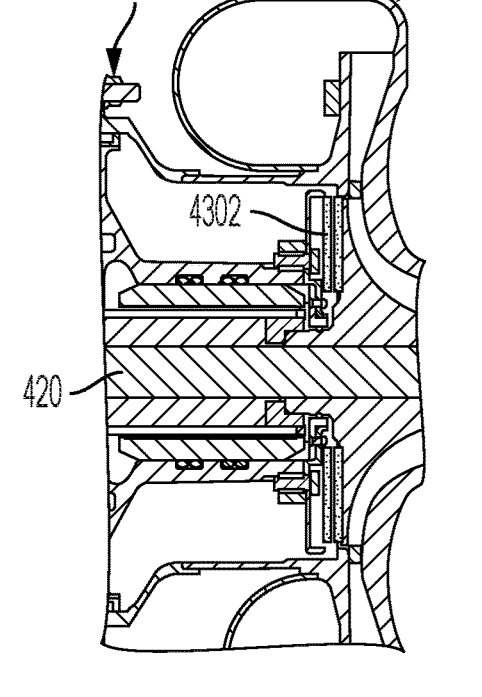
401
410
430 { 4301 / 4302 }
4301
420
FIG. 4
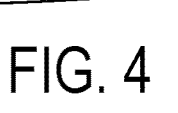
401
410
4302
420
FIG. 5

HYBRID AIRFOIL BEARING WITH ACTIVE DAMPING

BACKGROUND

The present disclosure relates to bearings and, in particular, to hybrid airfoil bearings with active damping.

A foil bearing, also known as a foil-air bearing or airfoil bearing, is a type of air bearing. A shaft is supported by a compliant, spring-loaded foil journal lining. Once the shaft is spinning fast enough, the working fluid (usually air) pushes the foil away from the shaft so that no contact occurs. The shaft and foil are separated by high-pressure air, which is generated by the rotation that pulls gas into the bearing via viscosity effects. The high speed of the shaft with respect to the foil is required to initiate the air gap, and once this has been achieved, no wear occurs. Unlike aerostatic or hydrostatic bearings, foil bearings require no external pressurization system for the working fluid, so the hydrodynamic bearing is self-starting.

SUMMARY

According to an aspect of the disclosure, a hybrid bearing assembly is provided and includes stationary components, a shaft disposed to rotate relative to the stationary components, passive magnetic bearing components integrated into the shaft and the stationary components to generate passive magnetic force to resist radial movement of the shaft relative to the stationary components and an active damping system. The active damping system includes a stationary coil, a magnetic element rotatable with the shaft to induce current in the stationary coil and a circuit electrically coupled with the stationary coil. The circuit is configured to determine from the current an attitude change of the shaft and the magnetic element and to apply damping current to the stationary coil to resist the attitude change.

In accordance with additional or alternative embodiments, further including airfoil bearing components to supplement the passive magnetic bearing components.

In accordance with additional or alternative embodiments, the airfoil bearing components include a top foil immediately surrounding the shaft and the passive magnetic bearing components remove a static load of the shaft on the top foil.

In accordance with additional or alternative embodiments, the stationary coil is provided as one or more velocity sensing coils.

In accordance with additional or alternative embodiments, the circuit is a transconductance amplified circuit.

In accordance with additional or alternative embodiments, the attitude change includes the radial movement of the shaft and the damping current generates a magnetic flux that interacts with the magnetic element to damp the attitude change.

In accordance with additional or alternative embodiments, the circuit is further configured to apply the damping current to the stationary coil to damp rotor-dynamic frequency modes.

In accordance with additional or alternative embodiments, the circuit is further configured to ignore unbalanced excitations of the shaft.

In accordance with additional or alternative embodiments, the hybrid bearing assembly is incorporated into one or more of a thrust bearing and a journal bearing.

According to an aspect of the disclosure, a motor is provided and includes stationary housing components, a shaft disposed to rotate relative to the stationary housing components and a hybrid bearing assembly configured to maintain a radial position of the shaft relative to the stationary housing components. The hybrid bearing assembly includes passive magnetic bearing components integrated into the shaft and the stationary housing components to generate passive magnetic force to resist radial movement of the shaft relative to the stationary housing components and an active damping system. The active damping system includes a stationary coil, a magnetic element rotatable with the shaft to induce current in the stationary coil and a circuit electrically coupled with the stationary coil. The circuit is configured to determine from the current an attitude change of the shaft and the magnetic element and to apply damping current to the stationary coil to resist the attitude change.

In accordance with additional or alternative embodiments, the attitude change includes the radial movement of the shaft and the damping current generates a magnetic flux that interacts with the magnetic element to damp the attitude change.

In accordance with additional or alternative embodiments, the circuit is further configured to apply the damping current to the stationary coil to damp rotor-dynamic frequency modes and to ignore unbalanced excitations of the shaft.

According to an aspect of the disclosure, a vehicle including the motor is provided and the motor is a motor of one or more of a cabin air compressor, a fan and a pump.

According to an aspect of the disclosure, a vehicle including the motor is provided and the motor is a motor of an air cycle machine (ACM).

According to an aspect of the disclosure, a motor is provided and includes stationary housing components, a shaft disposed to rotate relative to the stationary housing components and a hybrid bearing assembly configured to maintain a radial position of the shaft relative to the stationary housing components. The hybrid bearing assembly includes passive magnetic bearing components integrated into the shaft and the stationary housing components to generate passive magnetic force to resist radial movement of the shaft relative to the stationary housing components, airfoil bearing components to supplement the passive magnetic bearing components and an active damping system. The active damping system includes a stationary coil, a magnetic element rotatable with the shaft to induce current in the stationary coil and a circuit electrically coupled with the stationary coil. The circuit is configured to determine from the current an attitude change of the shaft and the magnetic element and to apply damping current to the stationary coil to resist the attitude change.

In accordance with additional or alternative embodiments, the attitude change includes the radial movement of the shaft and the damping current generates a magnetic flux that interacts with the magnetic element to damp the attitude change.

In accordance with additional or alternative embodiments, the circuit is further configured to apply the damping current to the stationary coil to damp rotor-dynamic frequency modes and to ignore unbalanced excitations of the shaft.

In accordance with additional or alternative embodiments, the airfoil bearing components include a top foil immediately surrounding the shaft and the passive magnetic bearing components remove a static load of the shaft on the top foil.

According to an aspect of the disclosure, a vehicle including motor is provided and the motor is a motor of one or more of a cabin air compressor, a fan and a pump.

According to an aspect of the disclosure, a vehicle including the motor is provided and the motor is a motor of an air cycle machine (ACM).

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1A is a schematic side view of a hybrid airfoil bearing with axial segmentation in accordance with embodiments;

FIG. 1B is a cross-sectional view of the hybrid airfoil bearing with the axial segmentation taken along line A-A of FIG. 1A in accordance with embodiments;

FIG. 1C is an illustration of magnetic flux lines of the hybrid airfoil bearing with the axial segmentation of FIG. 1A in accordance with embodiments;

FIG. 3 is a side view of an aviation motor including hybrid airfoil bearings in accordance with embodiments;

FIG. 4 is a side view of an air cycle machine (ACM) including axially arranged hybrid airfoil bearings in accordance with embodiments;

FIG. 5 is a side view of an air cycle machine (ACM) including radially arranged hybrid airfoil bearings in accordance with embodiments;

DETAILED DESCRIPTION

Figure 2A:
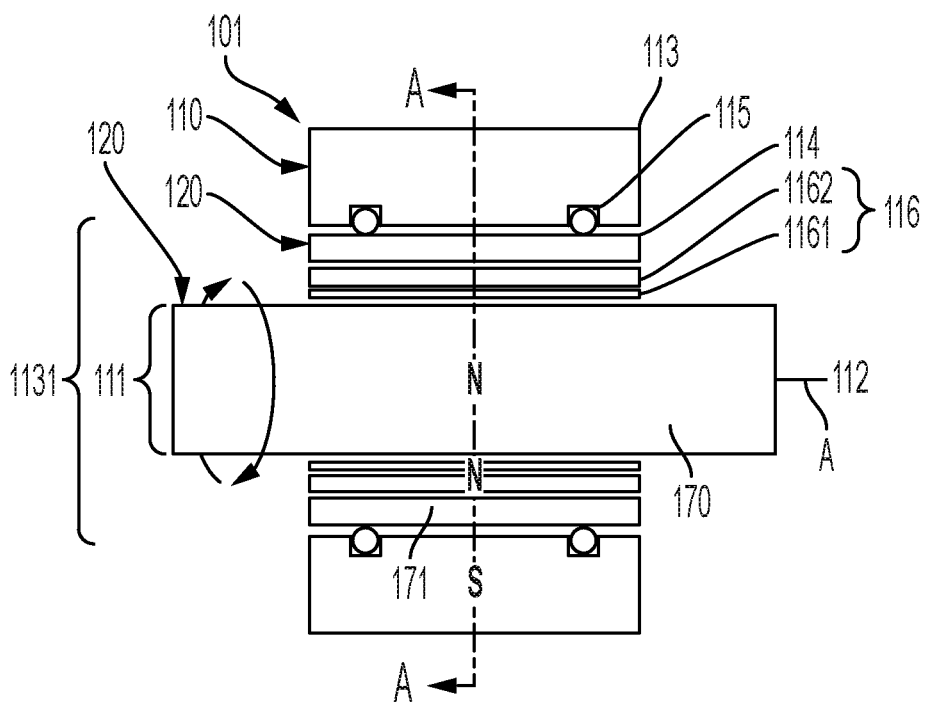
FIG. 2A is a schematic side view of a hybrid airfoil bearing with a radial configuration in accordance with embodiments.

Airfoil bearings have certain limitations. These include a minimum speed to activate, sensitivity to damage due to metal-to-metal contact and/or inadequate thermal management. Active magnetic bearings resolve many of these issues, but have added cost and weight as well as a need for circuitry to provide current for the electromagnet. In addition, it has been observed that permanent magnetic (PM) bearings tend to have no or limited damping and hybridization of PM and gas foil bearings (GFB) can be complicated due to the limited damping provided by GFB.

Thus, as will be described below, a new type of hybrid airfoil bearing is provided. This new type of hybrid airfoil bearing is based on the three technologies: airfoil bearings, PM bearings and active electromagnetic damping. The novel solution addresses the problems of PM bearings, such as weak damping or large eccentricity. In the novel solution electromagnetic damping provides complementary damping.

With reference to FIGS. 1A, 1B and 1C, a hybrid airfoil bearing 101 is provided for use with a shaft 112. The hybrid airfoil bearing 101 includes airfoil bearing components 110 and passive magnetic bearing components 120 that are integrated into the shaft 112 and the airfoil bearing components 110. The passive magnetic bearing components 120 can include or be provided with magnetic material that tends to retain its magnetic characteristics during high-temperature and high-pressure operations associated with aviation motors of an aircraft and air cycle machines (ACMs). that are integrated into the shaft 112 and the airfoil bearing components 110 The airfoil bearing components 110 include a top foil 1161 (see below) that immediately surrounds the shaft 112 and stationary components that define an inner bore 111. The shaft 112 is rotatable about a longitudinal axis A thereof within the inner bore 111 and relative to the stationary components. The stationary components include a housing 113, such as a motor housing, that defines an outer bore 1131 and a bearing sleeve 114 that is supported within the outer bore 1131. The stationary components further include elastomeric O-rings 115, by which the bearing sleeve 114 is supported within the outer bore 1131, and one or more foils 116 for supporting the shaft 112. The one or more foils 116 include the top foil 1161 and a corrugated bump foil 1162 surrounding the top foil 1161. With the top foil 1161 immediately surrounding the shaft 112, the bump foil 1162 immediately surrounds the top foil 1161. The one or more foils 116 can each include or be provided with high magnetic permeability materials. Additionally or alternatively, the one or more foils 116 can each be provided as a mesh.

The stationary components can also include one more filters that prevent particles, such as magnetic particles, from becoming trapped in the hybrid airfoil bearing 101.

During operation of the airfoil bearing components, if not for the presence of the passive magnetic bearing components 120, the shaft 112 would be supported as a static load by the one or more foils 116 (i.e., the top foil 1161) until the shaft 112 begins spinning or rotating fast enough for working fluid (i.e., air) to push the shaft 112 away from the one or more foils 116 so that no contact occurs. The initial contact between the shaft 112 and the one or more foils 116 (i.e., the static load of the shaft 112 on the top foil 1161) as well as the possibility of a loss of pressure of the working fluid during high-speed rotation of the shaft 112 can lead to wear and damage of the airfoil bearing components 110.

The passive magnetic bearing components 120 serve as auxiliary magnetic bearings to remove the static load of the shaft 112 on the top foil 1161 and to provide for auxiliary rotor or shaft support and emergency operation backup. For example, in case of a temporary loss of capacity due to low-speed rotation, rotor imbalance (surging), etc., the passive magnetic bearing components 120 would eliminate or reduce the chances of unit damage due to failure of the airfoil bearing components 110 maintaining separation of the shaft 112 and at least the top foil 1161 of the one or more foils 116. The passive magnetic bearing components 120 generate a repulsion force between the shaft 112 and at least the top foil 1161 of the one or more foils 116. This repulsion force is proportional to an inverse of a distance between the respective bearing surfaces of the shaft 112 and at least the top foil 1161 of the one or more foils 116 and becomes significant when the shaft 112 deviates from its centered (axial and/or radial) location.

In addition, since the passive magnetic bearing components 120 are integrated into the shaft 112 and the airfoil bearing components 110, the hybrid airfoil bearing 101 can be manufactured easily and without extensive additional costs.

With continued reference to FIGS. 1A, 1B and 1C, the shaft 112 can be provided as an elongate dipole magnet 1120 with a first end 131 and a second end 132 that is opposite the first end 131. At the first end 131, the shaft 112 includes first magnetic materials 141 having a first magnetic pole. At the second end 132, the shaft 112 includes second magnetic materials 142 having a second magnetic pole, which is opposite the first magnetic pole. At least one of the stationary components, such as the bearing sleeve 114 (for purposes of clarity and brevity, the following description will relate to the case in which the at least one of the stationary components is the bearing sleeve 114), can be provided as an elongate dipole magnet 1140 that surrounds the shaft 112 with a first end 151 corresponding to the first end 131 and a second end 152, which is opposite the first end 151 and corresponds to the second end 132. At the first end 151, the bearing sleeve 114 includes third magnetic materials 163 having the first magnetic pole. At the second end 152, the bearing sleeve 114 includes fourth magnetic materials 164 having the second magnetic pole. With this configuration, passive magnetic repulsion of the first magnetic materials 141 and the third magnetic materials 163 and passive magnetic repulsion of the second magnetic materials 142 and the fourth magnetic materials 164 suspends the shaft 112 within the inner bore 111 and maintains separation between the shaft 112 and both the bearing sleeve 114 and the one or more foils 116.

With the shaft 112 being provided as the elongate dipole magnet 1120, the description provided herein is distinguished from conventional cases in which an elongate dipole magnet is attached to or about a shaft. That is, in those conventional cases, passive magnetic components are not integrated into a shaft whereas in the description provided herein the passive magnet components 120 are integrated into the shaft 112 to form the shaft 112 into the elongate dipole magnet 1120.

It is to be understood that additional magnetic materials can be added to an exterior of the shaft 112, but not to the exclusion of passive magnetic materials being integrated into the shaft 112 as described above. It is to be further understood that the passive magnetic materials integrated into the shaft 112 and the bearing sleeve 114 need not be uniformly distributed throughout the shaft 112 or the bearing sleeve 114, particularly in the circumferential dimension. For example, the passive magnetic materials in the shaft 112 and the bearing sleeve 114 can be segmented along an entirety of the circumferential dimension of the shaft 112 and the bearing sleeve 114 and/or localized at one or more circumferential sections of the shaft 112 and the bearing sleeve 114 so that when the shaft 112 comes to rest, the one or more circumferential sections of the shaft 112 and the bearing sleeve 114 align in the vertical direction and remove the load of the shaft 112 on the one or more foils 116 in opposition to the force of gravity.

Figure 2B:
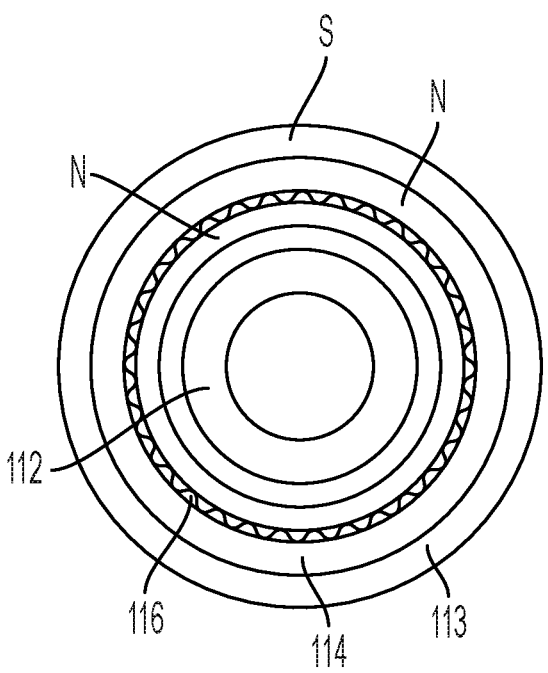
FIG. 2B is a cross-sectional view of the hybrid airfoil bearing with the radial configuration taken along line A-A of FIG. 2A in accordance with embodiments.

With reference to FIGS. 2A and 2B, the hybrid airfoil bearing 101 is provided with a similar overall configuration as the configuration described above but with a different passive magnetic arrangement. The following description will thus omit the details of the hybrid airfoil bearing 101 of FIGS. 2A and 2B that are already described above.

In FIGS. 2A and 2B, the shaft 112 includes an outer ring of magnetic materials 170 integrated therein and having a first magnetic pole and optionally an inner core of magnetic materials having a second magnetic pole and the bearing sleeve 114 includes an inner ring of magnetic materials 171 having the first magnetic pole and an outer ring of magnetic materials having the second magnetic pole. In this case, passive magnetic repulsion of the outer ring of magnetic materials 171 and the inner ring of magnetic materials 170 suspends the shaft 112 within the inner bore 111 and maintains separation between the shaft 112 and both the bearing sleeve 114 and the one or more foils 116. The shaft 112 can further include a hollow interior within the outer ring of magnetic materials 170 or an inner ring of magnetic materials that is either of a same pole as the outer ring of magnetic materials 170 or an opposite pole as the outer ring of magnetic materials 170. In any case, the shaft 112 does not include any portion formed of non-magnetic materials.

It is to be understood that additional magnetic materials can be added to an exterior of the shaft 112, but not to the exclusion of passive magnetic materials being integrated into the shaft 112 as described above. It is to be further understood that the passive magnetic materials integrated into the shaft 112 and the bearing sleeve 114 need not be uniformly distributed throughout the shaft 112 or the bearing sleeve 114, particularly in the circumferential dimension. For example, the passive magnetic materials in the shaft 112 and the bearing sleeve 114 can be segmented along an entirety of the circumferential dimension of the shaft 112 and the bearing sleeve 114 and/or localized at one or more circumferential sections of the shaft 112 and the bearing sleeve 114 so that when the shaft 112 comes to rest, the one or more circumferential sections of the shaft 112 and the bearing sleeve 114 align in the vertical direction and remove the load of the shaft 112 on the one or more foils 116 in opposition to the force of gravity.

As above, with the shaft 112 including the outer ring of magnetic materials 170 integrated therein, the description provided herein is distinguished from conventional cases in which a ring of passive magnetic materials is attached to or about a shaft of non-magnetic materials. That is, in those conventional cases, passive magnetic components are not integrated into a shaft whereas in the description provided herein the outer ring of magnetic materials 170 are integrated into the shaft 112.

Thus, in general, the shaft 112 and both the bearing sleeve 114 and the one or more foils 116 are respectively configured for passive magnetic repulsion of one another to suspend the shaft 112 within the inner bore 111 and to act as an auxiliary bearing for the airfoil bearing components 110.

It is to be understood that the magnetic materials of the embodiments of FIGS. 1A, 1B and 1C and the magnetic materials of the embodiments of FIGS. 2A and 2B may exhibit variable magnetization in circumferential, axial and/or radial dimensions to accommodate and/or account for possible variable attitude angles of the hybrid airfoil bearing 101.

With reference to FIG. 3, a device 301 is provided as an aviation motor of an aircraft and includes a housing 310, a stator 320, a rotor 330 that is rotatable within the housing 310 and one or more hybrid airfoil bearings 340. The stator 320 is configured to generate magnetic flux to drive rotation of the rotor 330. The one or more hybrid airfoil bearings 340 can be provided as first and second hybrid airfoil bearings 3401 and 3402. Each of the first and second hybrid airfoil bearings 3401 and 3402 is configured as described above with reference to FIGS. 1A, 1B and 1C or FIGS. 2A and 2B.

With reference to FIGS. 4 and 5, a device 401 is provided as an ACM and includes a housing 410, a rotor 420 that is rotatable within the housing 410 and one or more hybrid airfoil bearings 430. The one or more hybrid airfoil bearings 430 can be provided as an axially oriented hybrid airfoil bearing 4301 (see FIG. 4) and a radially oriented hybrid airfoil bearing 4302 (see FIG. 5). Each of the axially oriented hybrid airfoil bearing 4301 and the radially oriented hybrid airfoil bearing 4302 is configured as described above with reference to FIGS. 1A, 1B and 1C or FIGS. 2A and 2B. In each case of the hybrid airfoil bearings 430 being used with an ACM, the various sleeves described above can be integrated into the ACM.

Figure 6:
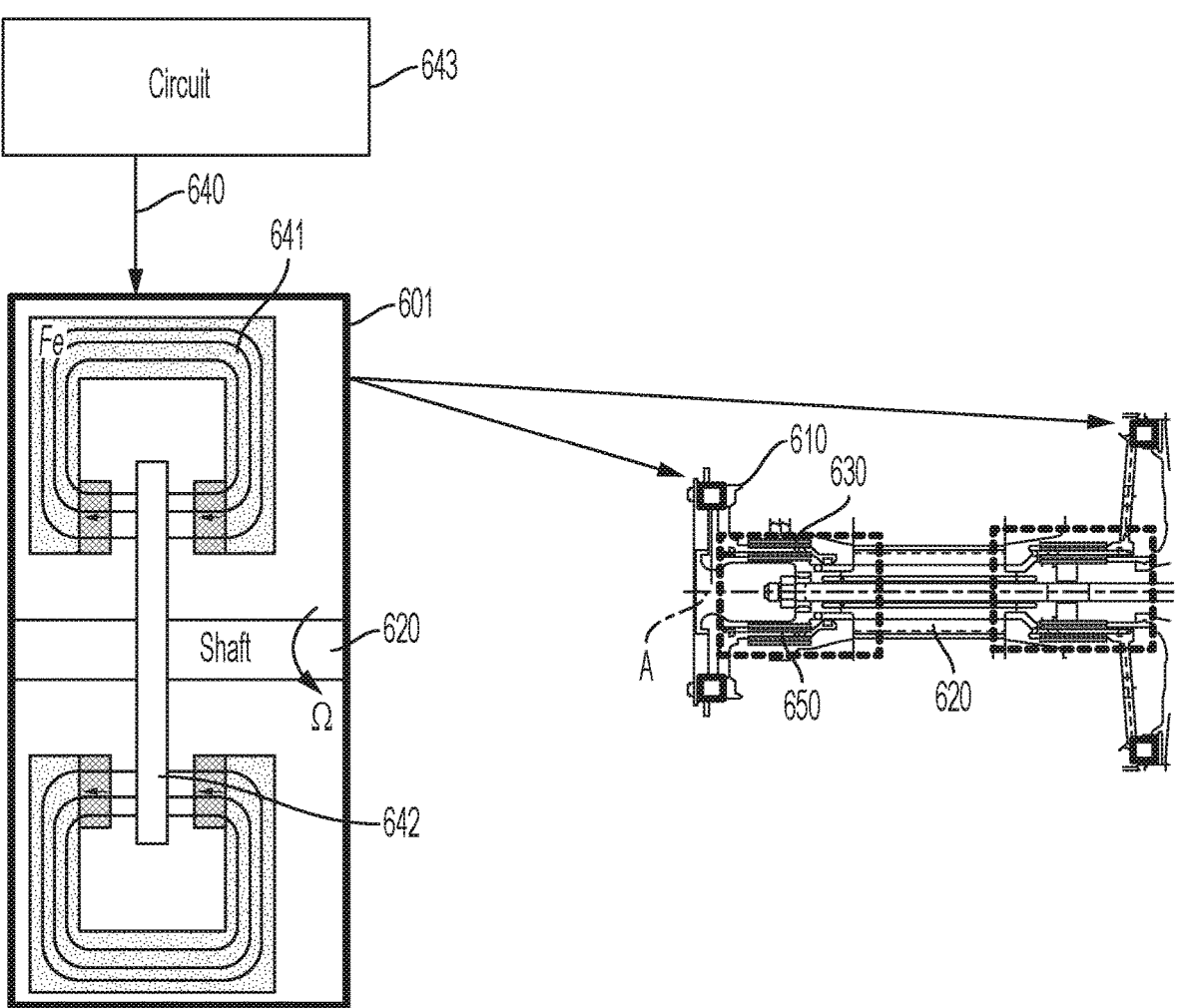
FIG. 6 is a schematic diagram of a hybrid bearing assembly in accordance with embodiments.

With continued reference to FIGS. 1A, 1B, 1C, 2A, 2B and 3-5 and with additional reference to FIG. 6, a hybrid bearing assembly 601 is provided. The hybrid bearing assembly 601 includes many features described in detail above, which will be apparent to a person of skill in the art and which need not be described again below. The hybrid bearing assembly 601 includes stationary components 610, a shaft 620 that is disposed to rotate about a rotational axis A thereof relative to the stationary components 610, passive magnetic bearing components 630 and an active damping system 640. As generally described above, the passive magnetic bearing components 630 are integrated into the shaft 620 and the stationary components 610 to generate passive magnetic force to resist radial movement of the shaft 620 relative to the stationary components 610. The active damping system 640 includes a stationary coil 641, which can be provided as one or more velocity sensing coils, a magnetic element 642 and a circuit 643. The magnetic element 642 is coupled to or integrated with the shaft 620 and, in some cases, can also be generally proximate to the stationary coil 641. As such, the magnetic element 642 is rotatable with the shaft 620 to thereby induce current in the stationary coil 641. The circuit 643 can be provided as a transconductance amplified circuit and is electrically coupled with the stationary coil 641.

The circuit 643 is configured to determine from the current induced in the stationary coil 641 an attitude change of the shaft 620 and the magnetic element 642 and to apply damping current to the stationary coil 641 to resist the attitude change. In accordance with embodiments, the attitude change of the shaft 620 and the magnetic element 642 can be the radial movement of the shaft 620 relative to the stationary components 610. In these or other cases, the damping current applied to the stationary coil 641 by the circuit 643 generates a magnetic flux that interacts with the magnetic element 642 to damp the attitude change. In accordance with further embodiments, the circuit 643 can be further configured to apply the damping current to the stationary coil 641 to damp rotor-dynamic frequency modes and/or can be configured to ignore unbalanced excitations of the shaft 620 at relatively high rotational speeds.

In accordance with embodiments, the hybrid bearing assembly 601 of FIG. 6 can further include airfoil bearing components 650, as described above, to supplement the passive magnetic bearing components 630. In these or other cases, the airfoil bearing components 650 can include a top foil (i.e., the top foil 1161 of FIGS. 1A and 2A) immediately surrounding the shaft 620 and the passive magnetic bearing components 630 can be disposed and configured to remove a static load of the shaft 620 on the top foil.

Figure 7:
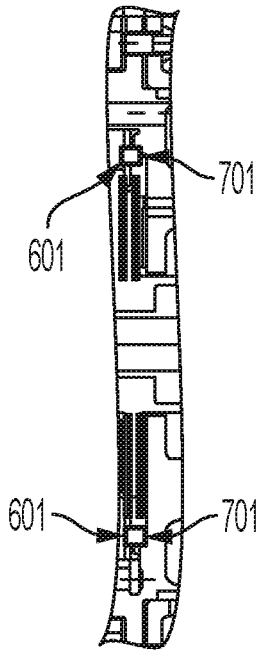
FIG. 7 is a side view of the hybrid bearing assembly of FIG. 6 incorporated into a thrust bearing in accordance with embodiments.
Figure 8:
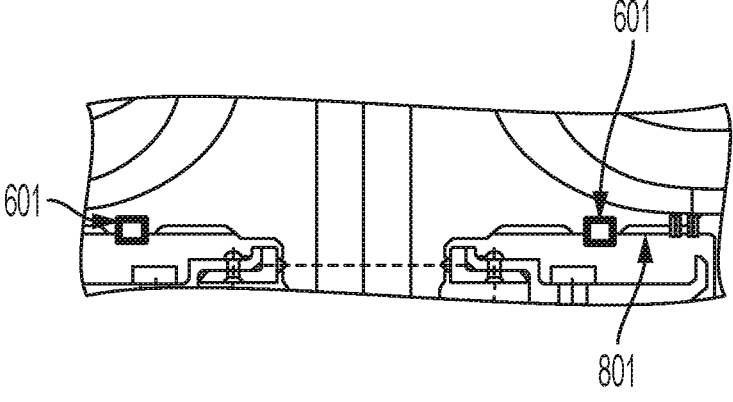
FIG. 8 is a side view of the hybrid bearing assembly of FIG. 6 incorporated into a journal bearing in accordance with embodiments.

With continued reference to FIG. 6 and with additional reference to FIGS. 7 and 8, the hybrid bearing assembly 601 of FIG. 6 can be incorporated into one or more of a thrust bearing 701 as shown in FIG. 7 and a journal bearing 801 as shown in FIG. 8.

The hybrid airfoil bearing 601 of FIG. 6 can be provided for use in a motor 602 as shown in FIG. 6. In these or other cases, the stationary components 610 are stationary housing components of the motor 602, the shaft 620 is disposed to rotate relative to the stationary housing components (the stationary components 610) and the hybrid bearing assembly 601 is configured to maintain a radial position of the shaft 620 relative to the stationary housing components (the stationary components 610). In accordance with embodiments, the motor 602 can be incorporated into a vehicle, such as an aircraft, as a component of the vehicle with the motor 602 being a motor 602 of one or more of a cabin air compressor, a fan and a pump and/or with the motor 602 being a motor 602 of an ACM. In each of these cases, the hybrid bearing assembly 601 can optionally include the above-described airfoil bearing components 650 to supplement the passive magnetic bearing components 630.

Technical effects and benefits of the present disclosure are the provision of a hybrid airfoil bearing that offers improved damping and better operation at low rotational speeds, increased bearing capacity, reduced or eliminated metal-to-metal contact in a case of a bearing overload, increased bearing durability and lifetime and minimal impact on weight and costs.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A hybrid bearing assembly, comprising:

stationary components;

a shaft disposed to rotate relative to the stationary components;

passive magnetic bearing components integrated into the shaft and the stationary components to generate passive magnetic force to resist radial movement of the shaft relative to the stationary components; and an active damping system comprising:

a stationary coil;

a magnetic element rotatable with the shaft to induce current in the stationary coil; and a circuit electrically coupled with the stationary coil and configured to determine from the current an attitude change of the shaft and the magnetic element and to apply damping current to the stationary coil to resist the attitude change, wherein:

the hybrid bearing assembly further comprises airfoil bearing components to supplement the passive magnetic bearing components, the airfoil bearing components comprise a top foil immediately surrounding the shaft and the passive magnetic bearing components remove a static load of the shaft on the top foil, and the stationary components comprise a housing defining an outer bore, a bearing sleeve supported within the outer bore and a singular bump foil completely surrounding the top foil in a circumferential direction.

2. The hybrid bearing assembly according to claim 1, wherein the stationary coil is provided as one or more velocity sensing coils.

3. The hybrid bearing assembly according to claim 1, wherein the circuit is a transconductance amplified circuit.

4. The hybrid bearing assembly according to claim 1, wherein:

the attitude change comprises the radial movement of the shaft, and the damping current generates a magnetic flux that interacts with the magnetic element to damp the attitude change.

5. The hybrid bearing assembly according to claim 1, wherein the circuit is further configured to apply the damping current to the stationary coil to damp rotor-dynamic frequency modes.

6. The hybrid bearing assembly according to claim 1, wherein the hybrid bearing assembly is incorporated into one or more of a thrust bearing and a journal bearing.

7. A motor, comprising:

stationary housing components;

a shaft disposed to rotate relative to the stationary housing components; and a hybrid bearing assembly configured to maintain a radial position of the shaft relative to the stationary housing components and comprising:

passive magnetic bearing components integrated into the shaft and the stationary housing components to generate passive magnetic force to resist radial movement of the shaft relative to the stationary housing components; and an active damping system comprising:

a stationary coil;

a magnetic element rotatable with the shaft to induce current in the stationary coil; and a circuit electrically coupled with the stationary coil and configured to determine from the current an attitude change of the shaft and the magnetic element and to apply damping current to the stationary coil to resist the attitude change, wherein:

the hybrid bearing assembly further comprises airfoil bearing components to supplement the passive magnetic bearing components, the airfoil bearing components comprise a top foil immediately surrounding the shaft and the passive magnetic bearing components remove a static load of the shaft on the top foil, and the stationary components comprise a housing defining an outer bore, a bearing sleeve supported within the outer bore and a singular bump foil completely surrounding the top foil in a circumferential direction.

8. The motor according to claim 7, wherein:

the attitude change comprises the radial movement of the shaft, and the damping current generates a magnetic flux that interacts with the magnetic element to damp the attitude change.

9. The motor according to claim 7, wherein the circuit is further configured to apply the damping current to the stationary coil to damp rotor-dynamic frequency modes.

10. A vehicle comprising the motor according to claim 7, wherein the motor is a motor of one or more of a cabin air compressor, a fan and a pump.

11. A vehicle comprising the motor according to claim 7, wherein the motor is a motor of an air cycle machine (ACM).

12. A motor, comprising:

stationary housing components;

a shaft disposed to rotate relative to the stationary housing components; and a hybrid bearing assembly configured to maintain a radial position of the shaft relative to the stationary housing components and comprising:

passive magnetic bearing components integrated into the shaft and the stationary housing components to generate passive magnetic force to resist radial movement of the shaft relative to the stationary housing components;

airfoil bearing components to supplement the passive magnetic bearing components; and an active damping system comprising:

a stationary coil;

a magnetic element rotatable with the shaft to induce current in the stationary coil; and a circuit electrically coupled with the stationary coil and configured to determine from the current an attitude change of the shaft and the magnetic element and to apply damping current to the stationary coil to resist the attitude change, wherein:

the airfoil bearing components comprise a top foil immediately surrounding the shaft and the passive magnetic bearing components remove a static load of the shaft on the top foil, and the stationary housing components comprise a housing defining an outer bore, a bearing sleeve supported within the outer bore and a singular bump foil completely surrounding the top foil in a circumferential direction.

13. The motor according to claim 12, wherein:

the attitude change comprises the radial movement of the shaft, and the damping current generates a magnetic flux that interacts with the magnetic element to damp the attitude change.

14. The motor according to claim 12, wherein the circuit is further configured to apply the damping current to the stationary coil to damp rotor-dynamic frequency modes.

15. A vehicle comprising the motor according to claim 12, wherein the motor is a motor of one or more of a cabin air compressor, a fan and a pump.

16. A vehicle comprising the motor according to claim 12, wherein the motor is a motor of an air cycle machine (ACM).

* * * * *